Figure 1:
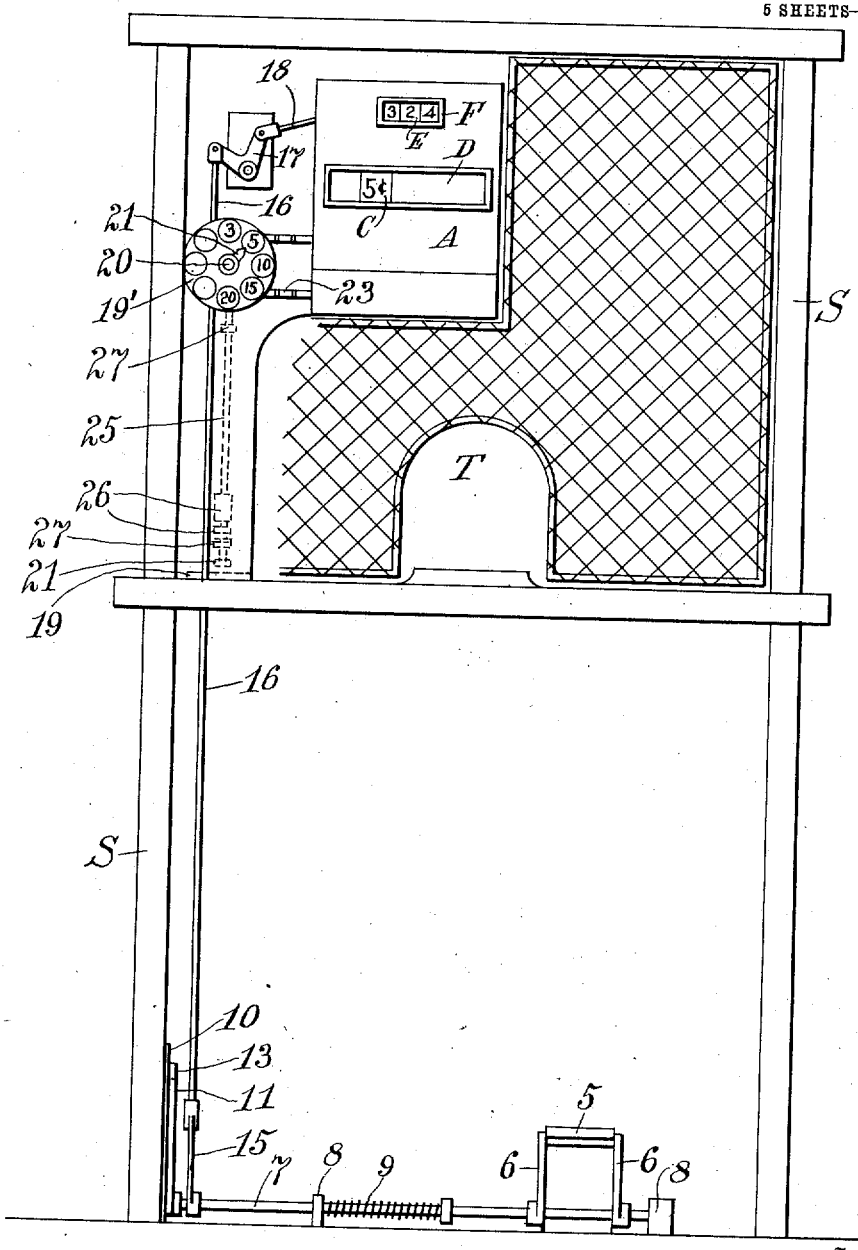

J. F. OHMER.

OPERATING MECHANISM FOR FARE REGISTERS.

APPLICATION FILED DEC. 13, 1910.

Reissued May 20, 1913.

13,566.

5 SHEETS—SHEET 1.

Witnesses

M. Siebler

A. S. Smith

Inventor

JOHN F. OHMER.

By R. J. McCarty his Attorney

COLUMBIA PLANOGRAPH CO., WASHINGTON, D. C.

J. F. OHMER.

OPERATING MECHANISM FOR FARE REGISTERS.

APPLICATION FILED DEC. 13, 1910.

Reissued May 20, 1913.

13,566.

5 SHEETS—SHEET 2.

Witnesses

M. Sieber

H. S. Smith

Inventor

JOHN F. OHMER.

By R. J. McCarty his Attorney

COLUMBIA PLANOGRAPH CO., WASHINGTON, D. C.

J. F. OHMER.

OPERATING MECHANISM FOR FARE REGISTERS.

APPLICATION FILED DEC. 13, 1910.

Reissued May 20, 1913. 13,566.

5 SHEETS—SHEET 3.

Witnesses
M. Sibler
H. S. Smith

Inventor
JOHN F. OHMER.

By R. J. McCarty
his Attorney

J. F. OHMER.

OPERATING MECHANISM FOR FARE REGISTERS.

APPLICATION FILED DEC. 13, 1910.

Reissued May 20, 1913. 13,566.

5 SHEETS—SHEET 4.

Inventor
JOHN F. OHMER.

Witnesses
M. Sibler
H. S. Smith

By R. J. McCarty his Attorney

COLUMBIA PLANOGRAPH CO., WASHINGTON, D. C.

J. F. OHMER.

OPERATING MECHANISM FOR FARE REGISTERS.

APPLICATION FILED DEC. 13, 1910.

Reissued May 20, 1913. 13,566.

5 SHEETS—SHEET 5.

Inventor

JOHN F. OHMER.

Witnesses

M. Siebler

H. S. Smith

By R. J. McCarty his Attorney

UNITED STATES PATENT OFFICE.

JOHN F. OHMER, OF DAYTON, OHIO, ASSIGNOR TO OHMER FARE REGISTER COMPANY, OF ROCHESTER, NEW YORK.

OPERATING MECHANISM FOR FARE-REGISTERS.

13,566. Specification of Reissued Letters Patent. Reissued May 20, 1913.

Original No. 971,630, dated October 4, 1910, Serial No. 416,418. Application for reissue filed December 13, 1910. Serial No. 597,169.

*To all whom it may concern:*

Be it known that I, JOHN F. OHMER, a citizen of the United States, residing at Dayton, in the county of Montgomery and State of Ohio, have invented certain new and useful Improvements in Operating Mechanism for Fare-Registers; and I do declare the following to be a full, clear, and exact description of the invention, such as will enable others skilled in the art to which it appertains to make and use the same, reference being had to the accompanying drawings and the letters and figures of reference marked thereon, which form a part of this specification.

This invention relates to operating mechanism for fare registers, and is especially adapted for the collection of fares on the "pay as you enter" plan as distinguished from the registration of fare collections taken up by the conductor after the passengers have entered the car. The system is available for use on the cars of elevated or underground railways, at ferries or stations. When used on the cars, the fare collector with the apparatus is located in a booth or vestibule at the entrance end of the car, and as the passengers enter, the fares are collected by him before they enter and are registered as collected. When used at a ferry or station, the fares are similarly collected and registered before the passengers are permitted to enter the inclosure or point where passage is taken. The system and means employed are equally available for the collection and registration of transactions at other places, for example, fairs or any place where an admission fee or ticket is collected before the persons are admitted.

In carrying out the objects of the invention, the fare registers and recorders disclosed in my prior patents are utilized, for example, Patent No. 874,424 granted December 24, 1907, may be referred to in this connection.

The present invention involves means whereby the ticket or fare collector is enabled to have free use of his two hands in collecting and indicating the fares or tickets, while with the foot he is enabled to operate the machines to register and indicate the fare collections at the machine.

In the drawings, I have illustrated the mechanism of the register proper as well as the mechanism by which the fare counters are selected for operation, and also I have illustrated on Sheets 1 and 2, the mechanism comprised in the invention and by means of which the person collecting the fares may register the same with the foot, thus having free use of both hands at all times for the handling of the fares and the setting of the mechanism for registering such fares.

Preceding a detailed description of the invention, reference is made to the accompanying drawings, of which—

Figure 2:
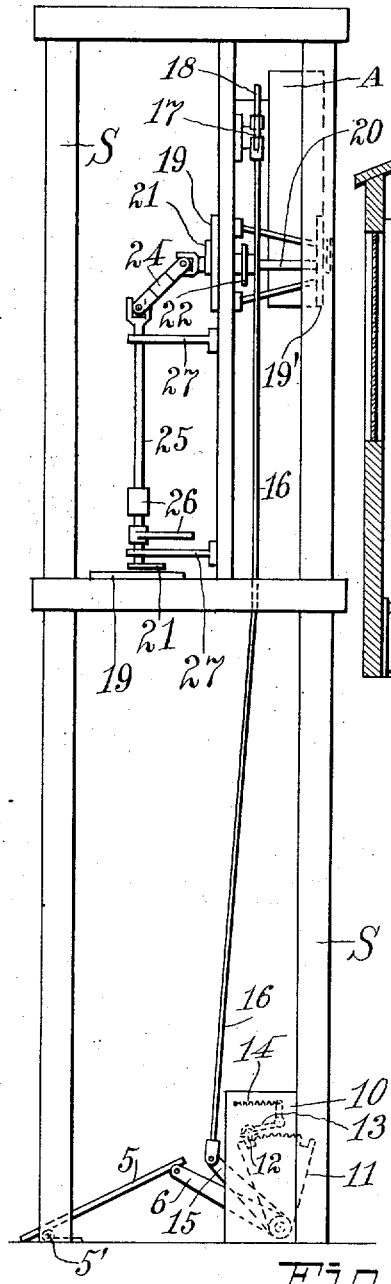
Figure 3:
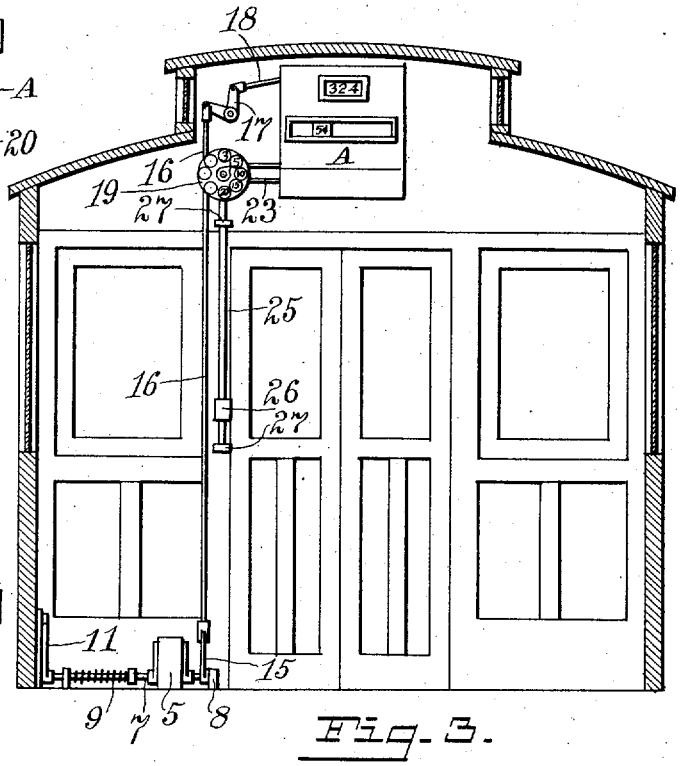
Figure 4:
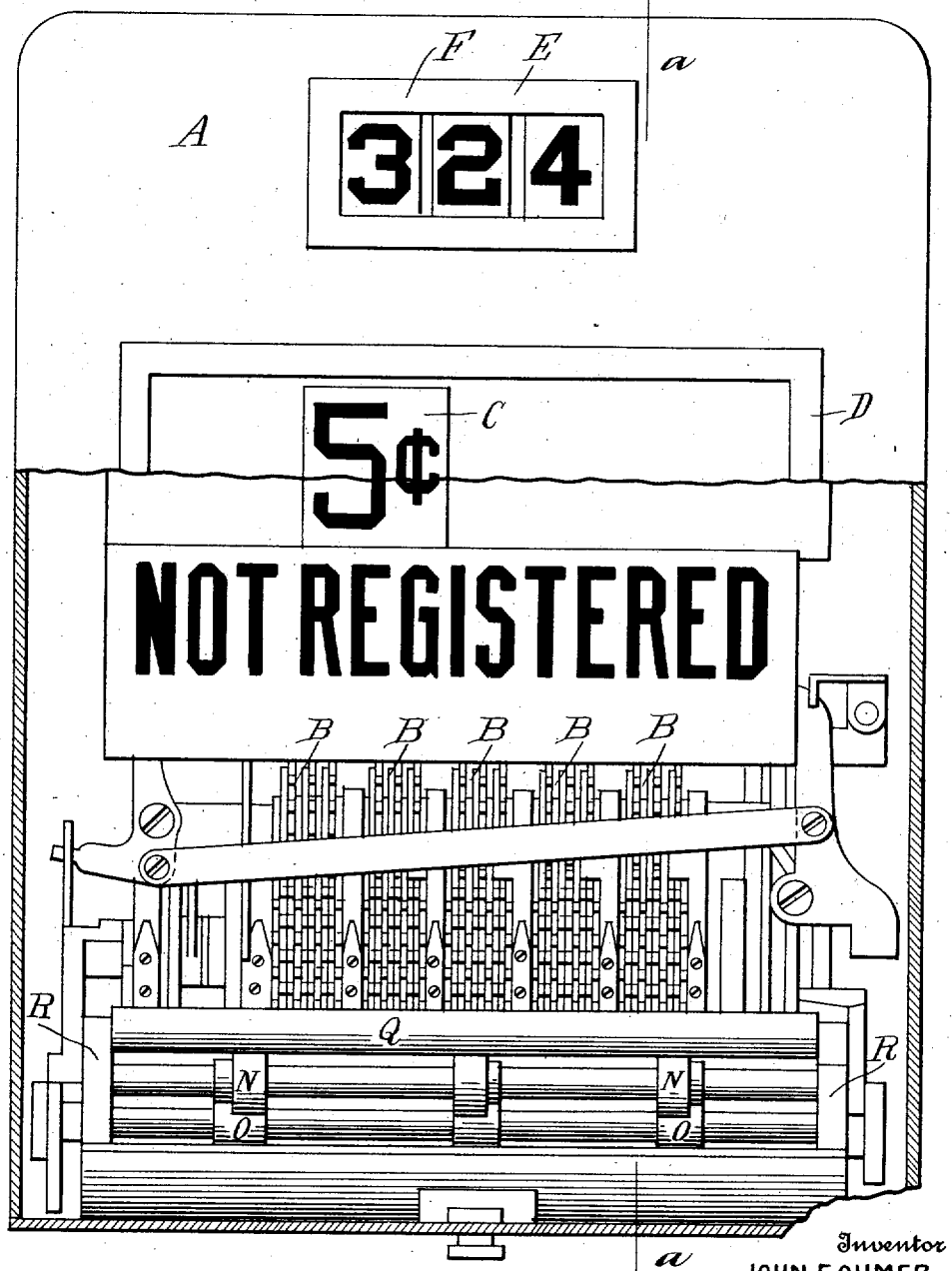
Figure 5:
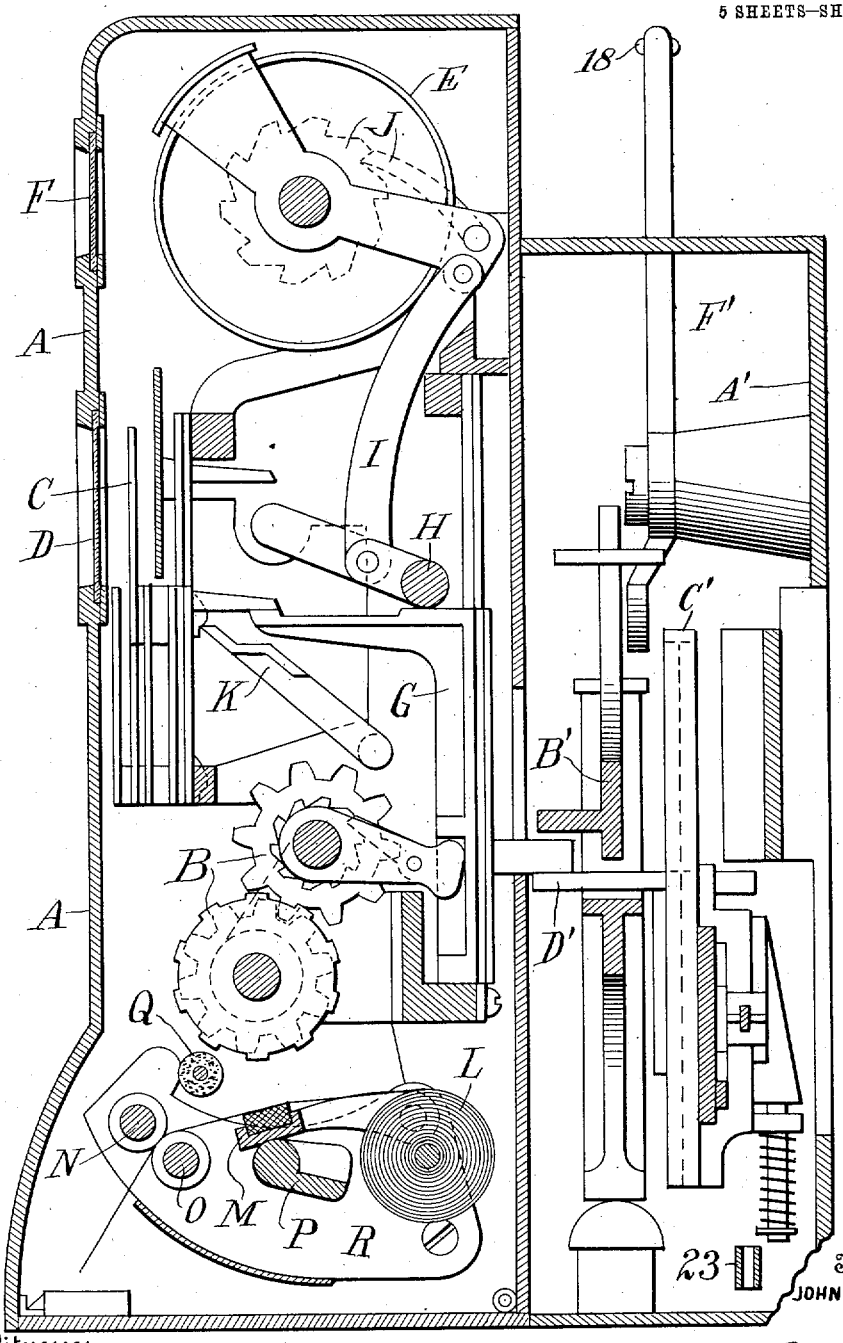
Figures 5, 7:
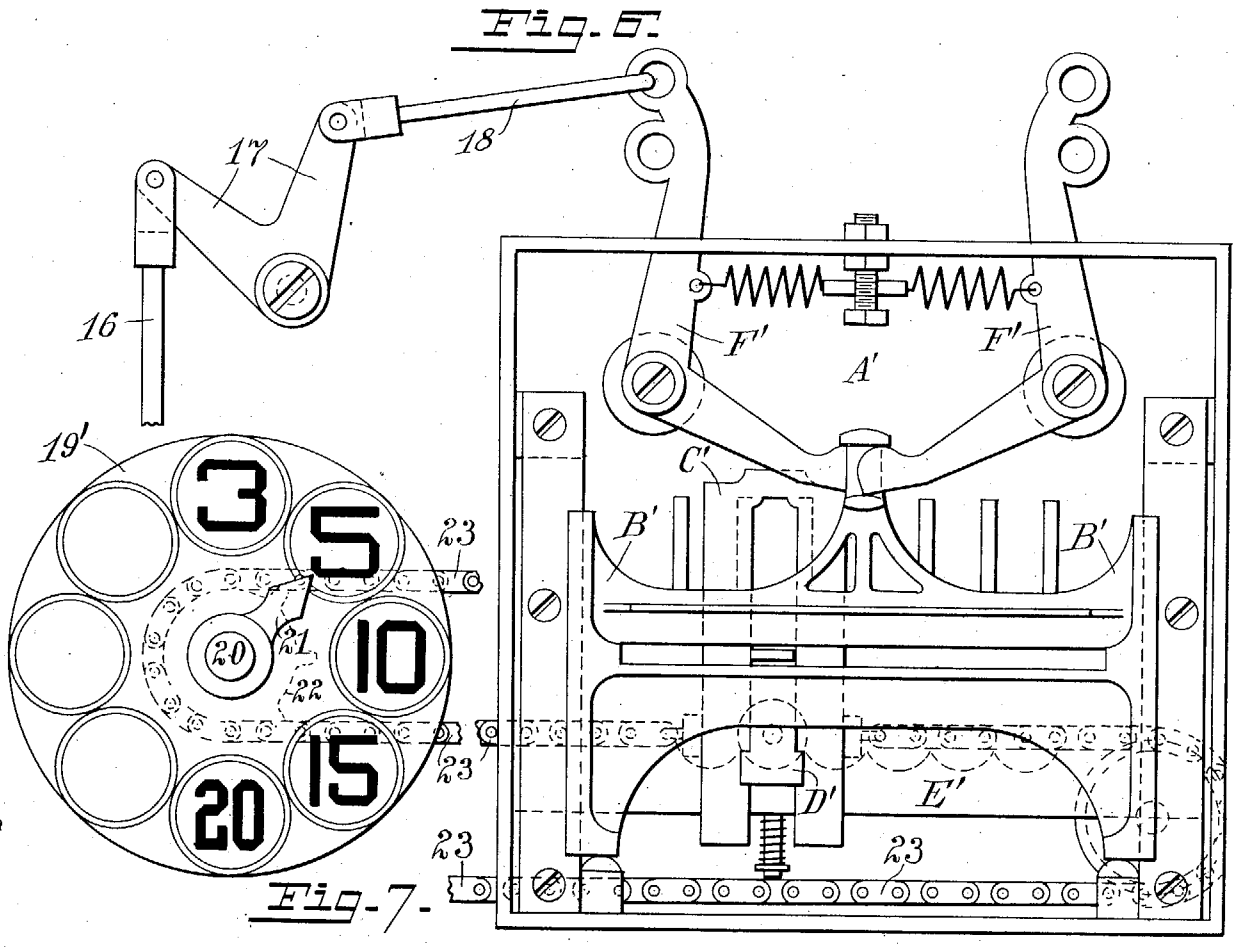

Figure 1 is a front elevation of a booth or other inclosure with a fare registering machine, setting mechanism and operating mechanism illustrated therewith. Fig. 2 is a side view of the devices illustrated in Fig. 1. Fig. 3 is an elevation of one interior end of a car having the same devices placed therein. Fig. 4 is a front elevation of a fare register with a portion of the casing broken away to disclose the interior mechanism. Fig. 5 is a side elevation of the registering mechanism and its operating mechanism, such view being a sectional view of the transverse elements of the mechanism. Fig. 6 is a detached elevation of the operating mechanism shown at the back of the register in Fig. 5. Fig. 7 is a view of one of the setting indicators, a feature of the fare-selective devices.

In a detailed description of the invention, similar reference characters indicate corresponding parts.

Inasmuch as the mechanism of the present invention contemplates the conjoint use of one of my well-known fare registers and recorders and its selective and operating mechanism, it is in order for me to briefly describe such features before giving a more particular description of the mechanism of the invention associated therewith. The registering, indicating and recording mechanism belonging to the register proper, is best illustrated in Figs. 4 and 5, wherein the casing A incloses the well-known fare counters B upon which the specific classes of fares are registered; the individual fare indicators C visually indicated through the sight opening D in the front of the register casing, and the trip or passenger indicator wheels E visually exposed through a sight opening F in the front of the register casing; the individual actuators G, of which there is one associated with each bank of fare counters and each specific fare indicator; the transverse oscillating bar H and connecting link I through which movement is imparted to the trip or passenger counters E through intervening ratchet devices J; the transverse holding bar K which supports each elevated fare indicator and other devices coöperatively associated with the above-named instrumentalities, and which, owing to their being fully described and illustrated in many of my former patents, require no further description.

The mechanism above referred to comprises a portion of the well-known register mechanism, and assembled therewith is the recording mechanism located in the lower portion of the machine and consisting of a roll of paper L which is led over the impression bar M through two feed rollers N and O; the actuating bar P which lifts the platen bar to press the web of paper against the printing wheels or counters, and the inking roller Q.

All of the above-mentioned recording devices are supported on the side plates R which are pivoted at their rear ends. The old and well known operating mechanism associated with the mechanism of the register, is illustrated in Figs. 5 and 6, and consists of a casting A′ secured to the rear of the register casing and having a vertically movable actuating member B′ which lifts the vertically slidable actuator D′, the latter being movable by the selective mechanism to a point to engage and lift any one of the actuating members G before referred to. The actuator D′ is slidably supported in the carriage or setting member C′ which is supported on a horizontal track E′ within the casing A′. The actuator or lift B′ is operated or elevated by one or the other of the bell crank levers F′ with which connects a longitudinally movable operating rod 18 pivotally connected to a bell crank lever 17 located at a point exterior to the register. Connected to the bell crank lever 17 is an actuating rod 16 to be hereinafter referred to.

Having briefly described the various well-known features of the register and its operating devices, I will now briefly refer to the setting or selective devices by means of which the actuator D′ is shifted to the desired position to engage one of the operating members G of the counter to register the selected fare.

19′ designates an auxiliary fare indicator constituting an element of the selective mechanism; one or more of these indicators may be placed at suitable points along the rotatable setting shaft 20. Upon this setting shaft in the rear of the auxiliary indicator nearer the register, is fixed a chain wheel 22 around which passes a chain or longitudinally movable member 23 to connect with the carriage C′ to set the same. Or a rod and crank connection may be substituted for said chain and chain wheel, such as shown in former Patent No. 908,030 granted December 29, 1908, to Ohmer and Heaton. On the setting shaft 20 in front of the indicator 19 is a pointer 21 fixed to the shaft and movable therewith to the various indications, such movement being concurrent with the carriage C′ and to a corresponding extent; for example, if the register or mechanism is set for a 5¢ fare, the carriage C′ is moved to the position to bring the actuator D′ in operative relation to the actuator C of that particular bank of counters.

Referring now to the devices comprising the present invention, S—Fig. 1 designates the station, inclosure or booth where the fare collector is stationed; this may be as before stated, in the rear vestibule of a car, or at a gate or elsewhere through which persons are admitted after paying their fare or passage. The fare collector sits on the inner side of this booth or inclosure while the individuals appear on the outer side and perform their transactions through the opening T. The register A is located to face the persons as they approach, and one of the auxiliary indicators 19 is located adjacent to the register facing the fare collector.

Connected with the end of the setting shaft 20 on the inside of the booth or inclosure, is a universal joint 24 which connects with a vertical section 25 of the setting rod or shaft 20 and which is supported in brackets 27, and may be operated by means of a hand-piece 26 by one hand of the conductor or fare collector, while the other hand receives the fare and delivers change through the opening T in the front of the booth. One of the auxiliary dials or indicators 19 is located in a horizontal position on the interior of the booth, and one is also located in a vertical position so that the collector may observe either in setting the mechanism of the register.

As seen in Fig. 3, the vertical setting rod 25 does not employ the universal joint 24 shown in Fig. 2, but the connection between said vertical rod or shaft and the horizontal setting shaft 20, may be of any of the well-known forms, such for example, as miter gears.

The connecting rod 16 hereinbefore referred to in connection with the bell crank lever 17, extends downwardly and is pivotally connected at its lower end to a crank arm 15 fixed to a treadle shaft 7, said treadle shaft being mounted in the base of the booth as shown in Fig. 1, or in the base of the car as shown in Fig. 3, in bearings 8. Fixed to another part of the treadle shaft 7, are treadle arms 6 which are joined at their upper ends and are engaged by a treadle board or foot piece 5 which is hinged at 5′ to the floor or base of the booth or car. Surrounding the intermediate portion of the treadle shaft 7, is a winding spring 9, which maintains the shaft 7 normally in the position shown in Fig. 2, in which position the treadle board 5 is elevated, foot pressure having been removed therefrom. This treadle board 5 is within convenient reach of the foot of the operator, and by pressing the same the operating mechanism shown in Fig. 6 is actuated to register the fare, the setting of said fare having taken place prior to such operation.

On one extreme end of the treadle shaft 7, is fixed a ratchet plate 11, the teeth of which are engaged by a right and left hand pawl 12 which is controlled by a lever 13, and both of which parts are pivoted to an upright plate 10 which stands against a side of the booth or the car as the case may be. The pawl-controlling lever 13 is held in engagement with the pawl 12 by a spring 14. This well-known full-stroke mechanism is instrumental in compelling a complete operation of the operating devices through the connecting rod 16.

In operating the device, whether it be in a booth, in a car or elsewhere, the operator or collector of the fares sits in the position facing the incoming persons, with one foot on the treadle board 5 and one hand on the grip 26 of the vertical setting shaft 25, the other hand being free to receive the fares through the opening or window T as hereinbefore specified.

I claim:

1. The combination with a series of registering counters, a corresponding series of indicators, a series of individual actuating members interposed between said counters and whereby the counters and the indicators are actuated, a main actuating member through which the individual actuating members are operated, means for selecting the individual actuating member of any particular counter, of a vertical actuating rod extending from a point adjacent to the register and connected therewith by a bell-crank lever, a horizontal rock shaft to which said vertical rod is flexibly connected, and a foot-treadle connected with the horizontal rock shaft whereby movement is imparted to said main actuating member through the rock shaft and the vertical rod, substantially as specified.

2. The combination with a register having a setting member, a rod operatively connected to said setting member, and means for actuating said register to register a fare, of an indicator independent of said register and comprising a dial and an axially movable pointer coöperating therewith to indicate the fare to be registered, and means actuated by said rod for setting said pointer to the desired indications.

3. The combination with a series of registering counters, corresponding series of indicators, a series of individual actuating members, a main actuating member through which the individual actuating members are operated, and means for selecting the individual actuating member of any particular counter, of a vertical actuating rod extending from a point adjacent to the register and connected therewith, a horizontal rock shaft to which said vertical actuating rod is flexibly connected, and a foot-treadle connected with the horizontal rock shaft, whereby movement is imparted to said main actuating member through the rock shaft and the vertical rod.

4. The combination with a register having a setting member, and an actuating member, of two longitudinally movable operating members operatively connected to said setting member and said actuating member respectively, a vertically disposed hand-operated member connected to one of the longitudinally movable operating members, and a vertically disposed foot-operated member connected to the other of said longitudinally movable operating members, whereby the setting member and actuating member are actuated to select and register fares.

In testimony whereof I affix my signature in the presence of two witnesses.

JOHN F. OHMER.

Witnesses:
MATTHEW SIEBLER,
E. B. GRIMES.

Copies of this patent may be obtained for five cents each, by addressing the "Commissioner of Patents, Washington, D. C."